US012000576B1

(12) United States Patent
Lee et al.

(10) Patent No.: US 12,000,576 B1
(45) Date of Patent: Jun. 4, 2024

(54) LIGHTING APPARATUS

(71) Applicant: LEEDARSON LIGHTING CO.,LTD., Fujian (CN)

(72) Inventors: Peng Lee, Fujian (CN); Tzu-Hua Wang, Fujian (CN); Ping Yang, Fujian (CN); Lin-Hua Wang, Fujian (CN)

(73) Assignee: LEEDARSON LIGHTING CO., LTD., Fujian (CN)

( * ) Notice: Subject to any disclaimer, the term of this patent is extended or adjusted under 35 U.S.C. 154(b) by 0 days.

(21) Appl. No.: 18/131,862

(22) Filed: Apr. 6, 2023

(51) Int. Cl.

| | |
|---|---|
| ***F21V 23/04*** | (2006.01) |
| ***F21S 8/02*** | (2006.01) |
| ***F21V 9/40*** | (2018.01) |
| ***F21V 23/00*** | (2015.01) |
| ***F21Y 115/10*** | (2016.01) |

(52) U.S. Cl.
CPC .............. *F21V 23/04* (2013.01); *F21S 8/026* (2013.01); *F21V 23/005* (2013.01); *F21V 23/0485* (2013.01); *F21V 9/40* (2018.02); *F21Y 2115/10* (2016.08)

(58) Field of Classification Search
CPC ......... F21V 23/005; F21V 23/04; F21S 8/026
See application file for complete search history.

(56) References Cited

U.S. PATENT DOCUMENTS

| | | | | |
|---|---|---|---|---|
| 11,085,622 | B1 * | 8/2021 | Huang | F21V 23/06 |
| 2021/0364158 | A1 * | 11/2021 | Wen | F21V 23/04 |
| 2022/0003397 | A1 * | 1/2022 | Zhang | F21V 3/00 |
| 2022/0307659 | A1 * | 9/2022 | Cohen | F21V 23/04 |

* cited by examiner

*Primary Examiner* — William N Harris
(74) *Attorney, Agent, or Firm* — Chun-Ming Shih; LANWAY IPR SERVICES

(57) ABSTRACT

A lighting apparatus includes a first light source, a second light source, a driver circuit, a main housing and a switch trigger. The switch base is coupled to the driver circuit. The house opening is disposed on a back side of the main housing. The back side of light source plate faces to the back side of the main housing. The switch trigger having a first end coupled to the switch base. The switch trigger extends through a plate opening of the light source plate to pass through the house opening to be operated by a user from the back side of the main housing. The switch trigger is operated to change a setting status of the switch base so as to change a light parameter for the driver circuit to control the first light source and the second light source.

18 Claims, 11 Drawing Sheets

LIGHTING APPARATUS

FIELD

The present invention is related to a lighting apparatus, and more particularly related to a lighting apparatus with a flexible control.

BACKGROUND

LED (Light Emitting Diode) technology was first discovered in 1907 by a British scientist named H. J. Round, but it wasn't until the 1960s that practical LEDs were developed. LED technology has since come a long way, and it is now a popular lighting solution due to its energy efficiency, durability, and versatility.

LEDs work by using a semiconductor to produce light when an electric current is applied. The color of the light produced depends on the materials used in the semiconductor. In the early days, LEDs were mostly used as indicator lights in electronic devices, but advancements in technology have made it possible to produce bright and efficient LED lights for a variety of applications.

LED technology has several advantages over traditional incandescent and fluorescent lighting. LEDs are more energy-efficient, producing more light per watt of power consumed. They also last longer, with an average lifespan of 50,000 hours, compared to the 1,000 to 2,000 hours of incandescent bulbs. LEDs are also more durable, as they are not made of fragile glass and can withstand shock and vibration. Additionally, LEDs can be designed to emit a specific color and can be dimmed or brightened as needed, making them highly versatile.

LED technology has now become ubiquitous in our everyday lives, from lighting our homes and offices to illuminating our streets and highways. It has also enabled the development of innovative new products, such as flexible displays and wearable technology.

LED (Light Emitting Diode) technology has revolutionized the lighting industry. There are several advantages to using LED technology on light devices.

First, LEDs are highly energy-efficient, converting most of the electrical energy they consume into light. They use up to 90% less energy than traditional incandescent bulbs, which means lower electricity bills and a reduced carbon footprint. This can translate into significant cost savings for individuals and businesses.

Second, LEDs have an average lifespan of 50,000 hours, which is significantly longer than traditional bulbs. This means that they need to be replaced less frequently, reducing maintenance costs and inconvenience. This also means that LED lights can last for years without needing to be replaced, which can save money and reduce waste.

Third, LEDs are highly durable and resistant to shocks and vibrations. They are made from solid-state materials that are less prone to damage than traditional bulbs, which are made of glass. This makes them ideal for use in outdoor lighting, where they can withstand harsh weather conditions.

Fourth, LEDs can be designed to emit light in a wide range of colors and intensities, making them highly versatile. They can also be used in a variety of applications, from backlighting to full illumination. This makes them ideal for use in a wide range of industries, from entertainment to healthcare.

Finally, LEDs turn on instantly, without the warm-up time required by traditional bulbs. This means that they can be used in situations where quick, reliable lighting is required, such as emergency lighting or in applications where lights need to be turned on and off frequently.

In conclusion, the advantages of using LED technology on light devices are many, including energy efficiency, long lifespan, durability, versatility, and instant-on capabilities. These benefits make LEDs a popular choice for a wide range of applications, from residential and commercial lighting to automotive and industrial lighting.

Despite the many advantages of LED technology, there is still room for improvement in the design and implementation of LED-based lighting systems. By addressing some of the challenges associated with LED lighting, we can create even more efficient and effective lighting solutions that can improve people's lives.

In conclusion, while LED technology has already transformed the lighting industry, there is still much to be done to improve the design and implementation of LED-based lighting systems. By addressing the challenges associated with LED lighting and improving its capabilities, we can create even better lighting solutions that can improve people's lives in countless ways.

SUMMARY

In some embodiments, a lighting apparatus includes a first light source, a second light source, a driver circuit, a main housing and a switch trigger.

The first light source is mounted on a first area of a light source plate.

The second light source is mounted on a second area of the same light source plate.

The driver circuit is mounted on a driver area of the same light source plate.

The switch base is mounted on the same light source plate, the switch base is coupled to the driver circuit.

The first area, the second area and the driver area are on a front side of the light source plate.

The main housing enclosed the light source plate.

The house opening is disposed on a back side of the main housing.

The back side of light source plate faces to the back side of the main housing.

The switch trigger having a first end coupled to the switch base.

The switch trigger extends through a plate opening of the light source plate to pass through the house opening to be operated by a user from the back side of the main housing.

The switch trigger is operated to change a setting status of the switch base so as to change a light parameter for the driver circuit to control the first light source and the second light source.

In some embodiments, the switch base is a signal converter for converting the setting status as a switch signal provided to the driver circuit to determine how to drive the first light source and the second light source.

In some embodiments, the switch trigger contains a switch board and a trigger lever.

The switch board is placed above the front side of the light source plate.

The switch board is coupled to the switch base.

The trigger lever is extended from the switch board passing through the plate hole toward the back side of the main housing.

In some embodiments, the first light source emits a first light.

The second light source emits a second light.

The first light and the second light have different color temperatures.

In some embodiments, the first light source and the second light source respectively have multiple LED modules.

Only a portion of the LED modules of the first light source and the second light source are enabled while other LED modules of the first light source and the second light source are disabled according to the setting status, in which even when the light apparatus is turned on, the other LED modules that are disabled do not receive electricity from the driver circuit.

In some embodiments, the switch base enables physical connection of the the portion of LED modules to the driver circuit while physically disconnected the other LED modules from the driver circuit according to the setting status of the switch base.

In some embodiments, the driver circuit has a first number of power wires.

The LED modules of the first light source and the second light source have a second number of LED modules.

Each LED module has a connecting wire.

The switch base is a routing device for selectively connecting a portion of the connecting wires to the power wires.

There are a second number of the connecting wires.

The first number is smaller than the second number.

Some connecting wires of the LED modules are not physically connected to the power wires when their associated LED modules are disabled.

In some embodiments, the main housing has a lateral opening from a lateral wall of the main housing for the switch trigger to pass though to be operated.

In some embodiments, the main housing is a downlight housing.

The main housing has a surface rim for covering a cavity opening of an installation cavity.

A major part of the main housing is inserted into the installation cavity.

The lateral wall is hidden by the surface rim in the installation cavity.

In some embodiments, the surface rim has a first side and a back side.

The first side of the surface rim faces to the installation cavity.

The second side of the surface rim faces to a light exit direction of a light opening defined by the surface rim.

A first switch device is placed on the first side to change the setting status of the switch base.

The first switch device is concealed by the surface rim.

In some embodiments, a second switch device is disposed on the second side of the surface rim to be operated to change the setting status of the switch base.

In some embodiments, the surface rim is rotatable with respect to a lateral wall of the downlight housing to change the setting status of the switch base.

In some embodiments, an elastic pad is placed to cover the housing hole of the main housing.

A user may press the elastic pad to indirectly engage the switch trigger to change the setting status of the switch base.

In some embodiments, the first light source and the second light source contain multiple LED modules, each module is packaged in a cartridge.

The cartridge is detachably inserted to the main housing.

In some embodiments, the cartridge has a type identifier device for the driver to recognize a type of the cartridge to determine a corresponding driving parameter to drive the inserted cartridges.

In some embodiments, the lighting apparatus may also include a third light source and a separator.

The separator separates the first light source and the second light source from the third light source.

The third light source emits a third light from a lateral side of the main housing.

In some embodiments, the third light source is placed on a third area of the front side of the light source plate.

The third area is in a peripheral area of the light source plate.

In some embodiments, a touch device is placed on a exterior surface of the main housing for receiving a touch operation to change the setting status of the switch base.

In some embodiments, a plug is inserted from the house hole to a different position of the switch base to change the setting status of the switch base.

In some embodiments, the switch plug has two arms.

The switch plug has two directions to be inserted into the housing hole to correspond to two different setting statuses of the switch base.

DETAILED DESCRIPTION

Figure 7:
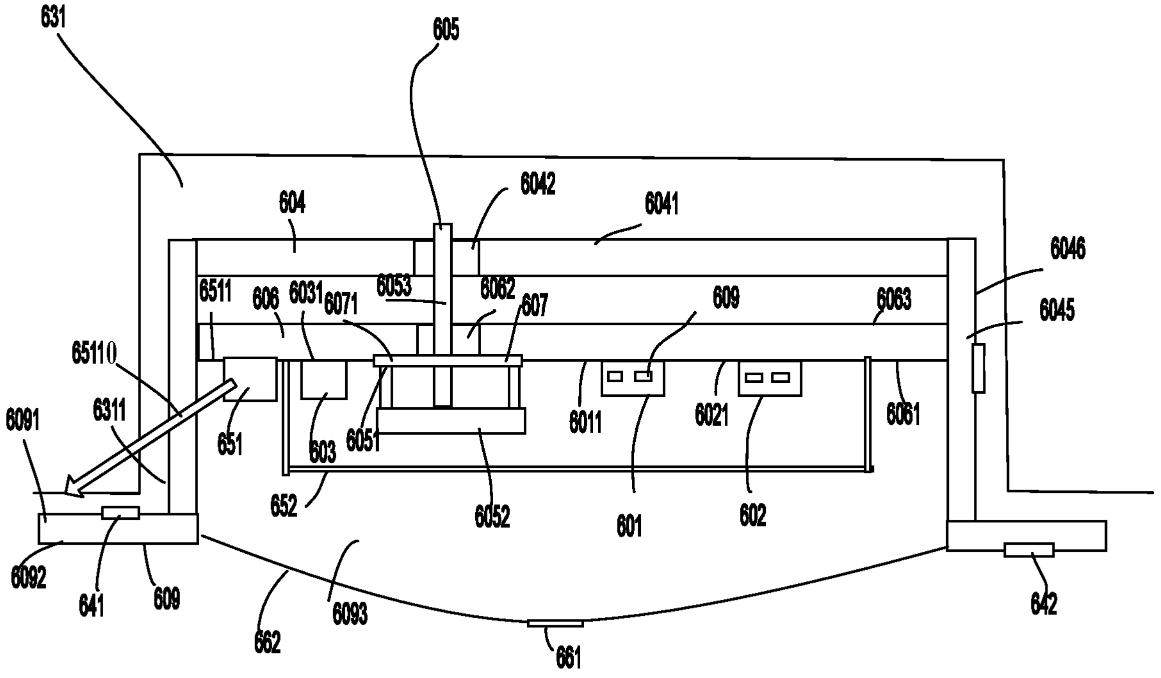
FIG. 7 illustrates a lighting apparatus example.

In FIG. 7, a lighting apparatus includes a first light source 601, a second light source 602, a driver circuit 603, a main housing 604 and a switch trigger 605.

The first light source 601 is mounted on a first area 6011 of a light source plate 606.

The second light source 602 is mounted on a second area 6021 of the same light source plate 606.

The driver circuit 603 is mounted on a driver area 6031 of the same light source plate 606.

The switch base 607 is mounted on the same light source plate 606. The switch base 607 is coupled to the driver circuit 603. The switch base 607 may include one or more electrical and/or mechanical components for routing the operation of the switch trigger 605 to the driver circuit 603.

The driver circuit 603 may include a power module and a control module. The power module may include a rectifier, a protection circuit, a filter, a current source and other circuit components to convert indoor AC power to DC power as driving currents supplied to the first light source 601 and the second light source 602.

The control module may include one more control circuits or integrated chips for controlling the power module to supply corresponding driving currents to the first light source and the second light source to generate a desired light output, e.g. with a desired color temperature or a color mixed by the first light source and the second light source.

The first area 6011, the second area 6021 and the driver area 6031 are on a front side 6061 of the light source plate 606.

The main housing 604 encloses the light source plate 606.

The house opening 6042 is disposed on a back side 6041 of the main housing 604.

The back side 6063 of light source plate 606 faces to the back side 6041 of the main housing 604.

The switch trigger 605 has a first end 6051 coupled to the switch base 607.

The switch trigger 605 extends through a plate opening 6062 of the light source plate 606 to pass through the house opening 6042 to be operated by a user from the back side 6041 of the main housing 604. For example, the switch trigger 605 may provide three options to select. Users hold a tip of the switch trigger 605 and moves the tip to align to a desired option to inform the driver circuit 603 to control the first light source 601 and the second light source 602 to generated a desired mixed light.

The switch trigger 605 is operated to change a setting status 6071 of the switch base 607 so as to change a light parameter 6031 for the driver circuit 603 to control the first light source 601 and the second light source 602. The setting status is a status or a value that is stored by a relative mechanical position or an electrical signal stored in a storage device.

The light parameter 6031 may refer to a color temperature, a working mode, a color and/or any parameters for controlling the first light source 601 and the second light source 602.

In some embodiments, the switch base 607 is a signal converter for converting the setting status as a switch signal provided to the driver circuit 603 to determine how to drive the first light source 601 and the second light source 602.

For example, the switch 607 may include an adjustable resistor which is coupled to the driver circuit 603. The driver circuit 603 accesses the adjustable resistor and generates corresponding driving currents to the first light source 601 and the second light source 602 to achieve a desired light output.

In some embodiments, the switch trigger 605 contains a switch board 6052 and a trigger lever 6053.

The switch board 6052 is placed above the front side 6061 of the light source plate 606.

The switch board 6052 is coupled to the switch base 607.

The trigger lever 6053 is extended from the switch board 6052 passing through the plate hole 6062 toward the back side 6041 of the main housing 604.

In some embodiments, the first light source 601 emits a first light.

The second light source 602 emits a second light.

The first light and the second light have different color temperatures.

In some embodiments, the first light source 601 and the second light source 602 respectively have multiple LED modules 609.

Only a portion of the LED modules 609 of the first light source 601 and the second light source 602 are enabled while other LED modules of the first light source and the second light source are disabled according to the setting status, in which even when the light apparatus is turned on, the other LED modules that are disabled do not receive electricity from the driver circuit.

In some embodiments, the switch base enables physical connection of the the portion of LED modules to the driver circuit while physically disconnected the other LED modules from the driver circuit according to the setting status of the switch base.

In some embodiments, the driver circuit has a first number of power wires.

The LED modules of the first light source and the second light source have a second number of LED modules.

Each LED module has a connecting wire.

The switch base is a routing device for selectively connecting a portion of the connecting wires to the power wires.

There are a second number of the connecting wires.

The first number is smaller than the second number.

Some connecting wires of the LED modules are not physically connected to the power wires when their associated LED modules are disabled.

Figure 9A:
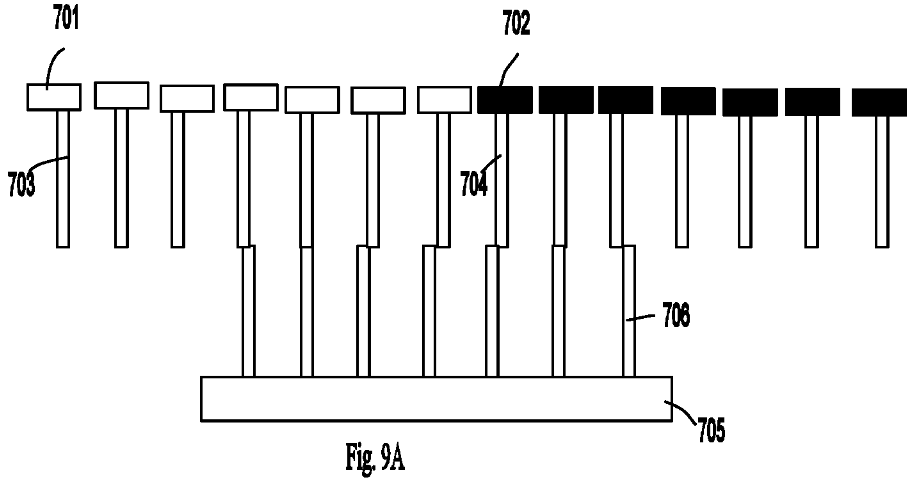
FIG. 9A illustrates a first wiring status.

FIG. 9A shows the first light source has seven LED modules 701, marked as white background rectangular elements. The second light source has seven LED modules 702, marked as black background rectangular elements.

Each LED module 701, 702 has a corresponding connecting wire 703, 704. The driver circuit 705 provides seven power wires 706.

In FIG. 9A, the seven power wires 706 are physically coupled to four LED modules of the first light source 701, and three LED modules of the second light source 702.

Figure 9B:
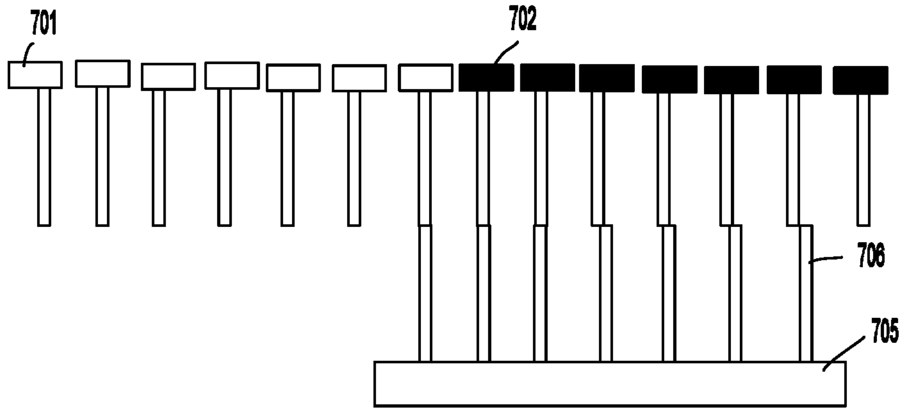
FIG. 9B illustrates a second wiring status.

In FIG. 9B, the seven power wires 706 of the driver circuit 705 are physically coupled to one LED module of the first light source 701 and six LED modules of the second light source 702.

The switch base, not shown, changes physical routing between the power wires and the connecting wires to change the ratio of the LED modules of the first light source and the second light source to be coupled to the power wires of the driver circuit to achieve a desired light output, e.g. a desired color temperature.

The switch base may be designed with a mechanical structure to route and modify the wire connection as mentioned above, or be designed with an electrical relay which routes the connection of electrical coupling. Persons of ordinary skilled in the art would know how to route and modify connection between multiple wires and thus further details are not addressed here for brevity.

Figure 6:
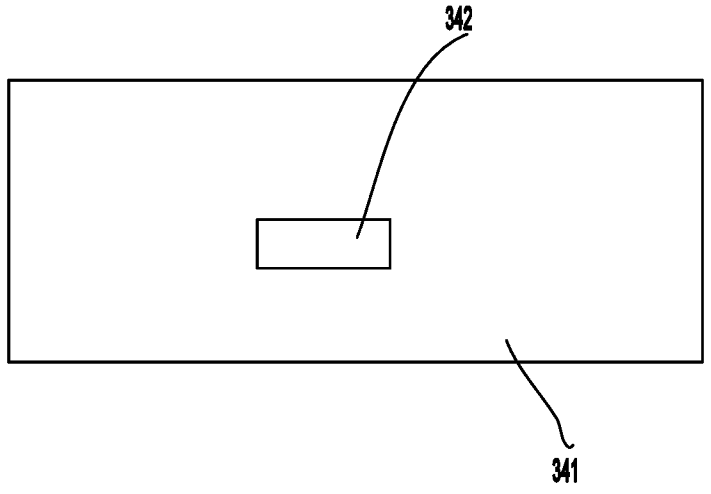
FIG. 6 illustrates an example of a house hole on a back side of a main housing.

In FIG. 6, the main housing 604 has a lateral opening 6045 from a lateral wall 6046 of the main housing 604 for the switch trigger 605 to pass though to be operated.

Instead of being disposed on the back side of the main housing, the switch trigger 605 may be placed on the lateral side of the main housing.

In some embodiments, the main housing is a downlight housing. FIG. 6 shows such an example.

The main housing 604 has a surface rim 609 for covering a cavity opening 6311 of an installation cavity 631. In some embodiments, the installation cavity is a cavity formed within a ceiling for inserting a downlight device. A junction box may also be used in the installation cavity in some other embodiments.

A major part of the main housing 604 is inserted into the installation cavity 631.

The lateral wall is hidden by the surface rim 609 in the installation cavity 631.

In some embodiments, the surface rim 609 has a first side 6091 and a second side 6092.

The first side 6091 of the surface rim 609 faces to the installation cavity 631.

The second side 6092 of the surface rim 609 faces to a light exit direction of a light opening 6093 defined by the surface rim 609.

A first switch device 641 is placed on the first side 6091 to change the setting status of the switch base.

The first switch device 641 is concealed by the surface rim 609.

In some embodiments, a second switch device 642 is disposed on the second side 6092 of the surface rim 609 to be operated to change the setting status of the switch base.

FIG. 6 shows multiple options where the switch may be disposed. Please be noted that different positions may have different advantages and thus are selected by designers for their needs. For example, in some case, designers may hope the users not to adjust the setting casually, while in some other case, the designers may hope the users able to adjust the setting conveniently.

In some embodiments, the surface rim 609 is rotatable with respect to a lateral wall 6045 of the downlight housing to change the setting status of the switch base.

In some embodiments, an elastic pad is placed to cover the housing hole of the main housing.

Figure 8:
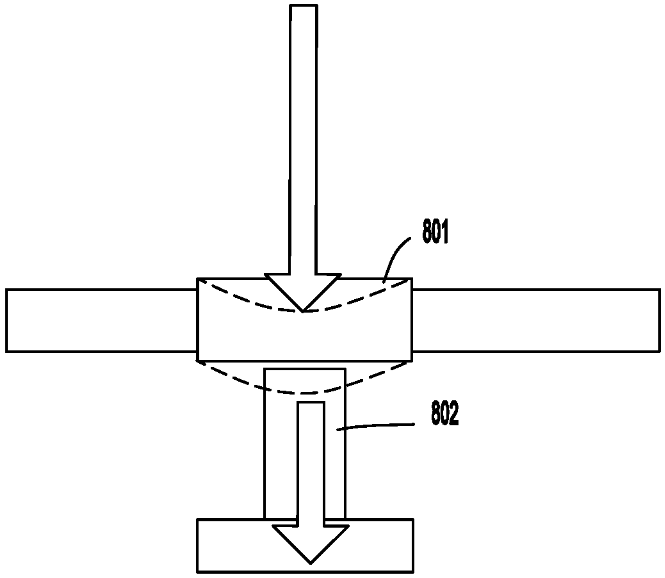
FIG. 8 illustrates an elastic pad used in a switch design.

FIG. 8 shows an elastic pad 801 that may be pressed by a user to change shape as illustrated in the dashed line to engage the trigger 802 below the elastic pad 801.

A user may press the elastic pad to indirectly engage the switch trigger to change the setting status of the switch base.

Figure 10:
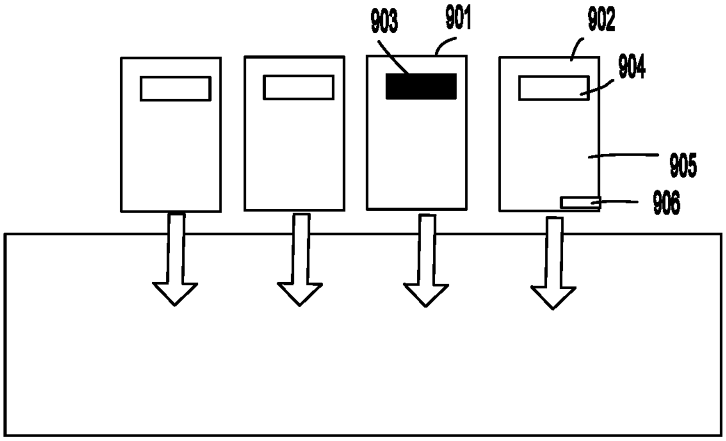
FIG. 10 illustrates a cartridge style design.

In FIG. 10, the first light source 901 and the second light source 902 contain multiple LED modules 903, 904, each module is packaged in a cartridge 905. The cartridge 905 refers to a container that contains the LED module so as to be added to the lighting apparatus in a flexible way. When any cartridge has some problem, e.g. broken, the cartridge may be replaced instead of dropping off complete lighting apparatus.

The cartridge is detachably inserted to the main housing.

In some embodiments, the cartridge has a type identifier device 906 for the driver circuit to recognize a type of the cartridge to determine a corresponding driving parameter to drive the inserted cartridges.

In FIG. 6, the lighting apparatus may also include a third light source 651 and a separator 652.

The separator 652 separates the first light source 601 and the second light source 602 from the third light source 651. The reflector may be a cover with some portion marked with non-transparent material so that the light of the third light source 651 is not affecting the first light source and the second light source.

The third light source 651 emits a third light 65110 from a lateral side of the main housing 604.

In some embodiments, the third light source 651 is placed on a third area 6511 of the front side of the light source plate 606.

The third area 6511 is in a peripheral area of the light source plate 606. The third light source 651 may be used as a night light that emits light from lateral side which is a soft indirect light source.

In some embodiments, a touch device 661 is placed on a exterior surface of the main housing or a light cover 662 for receiving a touch operation to change the setting status of the switch base.

Figure 11A:
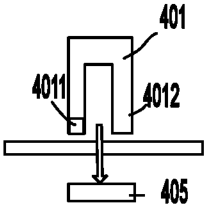
FIG. 11A and FIG. 11B shows two modes selected by plugging a switch.
Figure 11B:
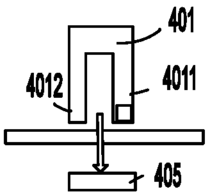

In FIG. 11A and FIG. 11B, a plug 401 is inserted from the house hole to a different position of the switch base 405 to change the setting status of the switch base.

In some embodiments, the switch plug 401 has two arms 4011, 4012.

The switch plug has two directions to be inserted into the housing hole to correspond to two different setting statuses of the switch base. FIG. 11A and FIG. 11B show changing the direction of the plug 401 to select one from two options of the switch base 405, e.g. with a connection status, or a changed resistor value.

Please be noted that above embodiments are only for explanation and not for limiting the invention scope.

Figure 1:
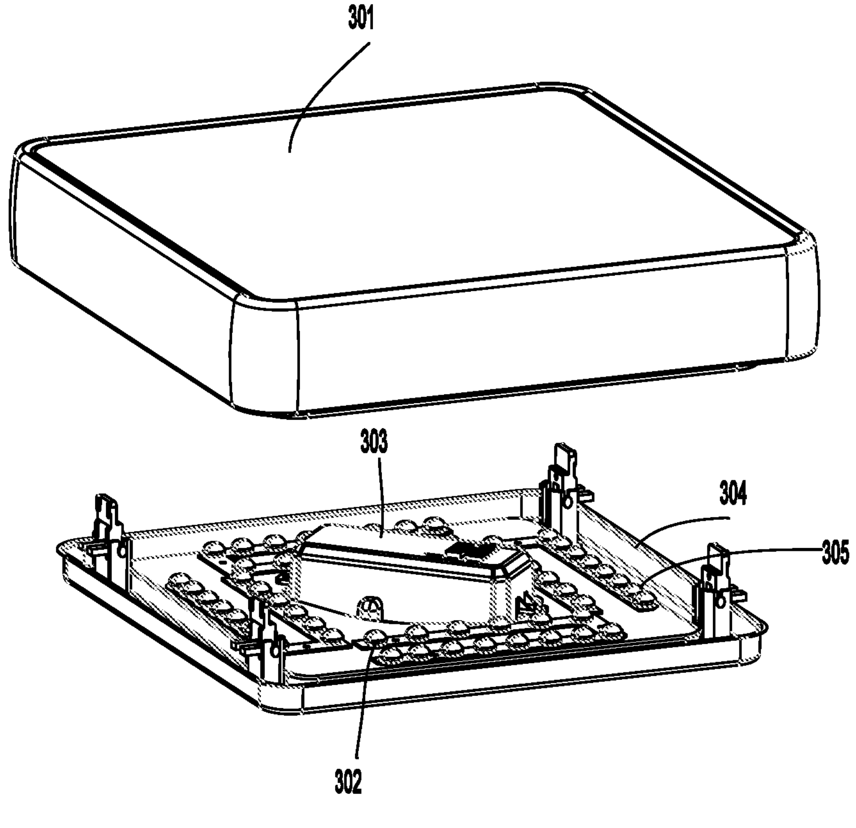
FIG. 1 illustrates a lighting apparatus embodiment.

FIG. 1 shows another lighting apparatus embodiment. In FIG. 1, the lighting apparatus has a light cover 301 which is attached to lateral wall 304 of the main housing. There is a driver circuit 303, first light source 305, and second light source 302.

Figure 2:
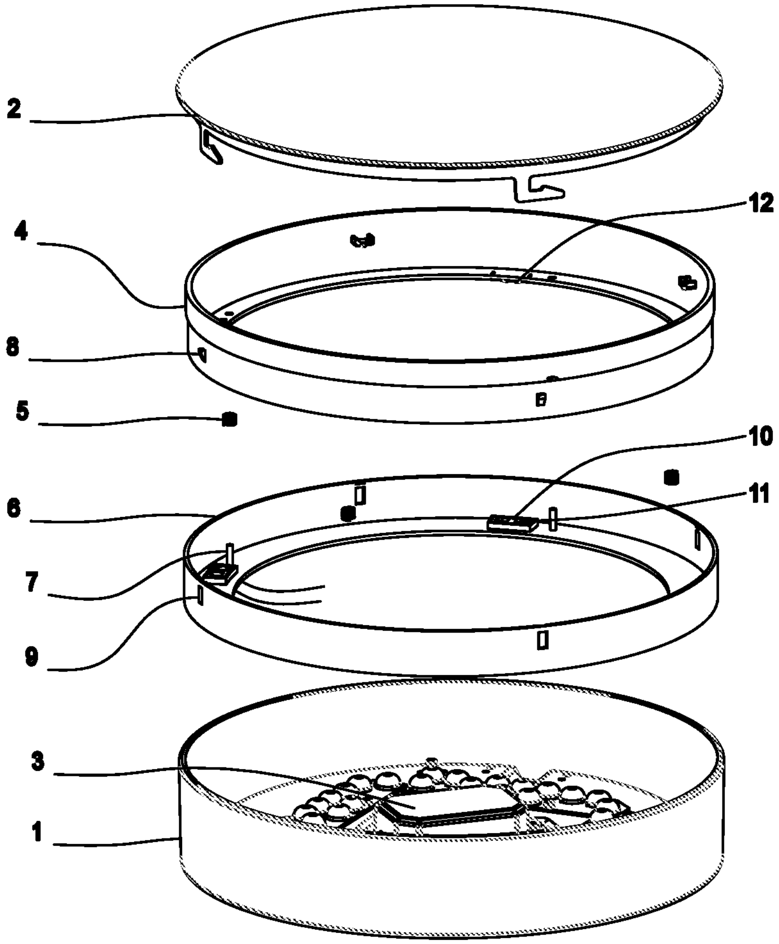
FIG. 2 illustrates another lighting apparatus embodiment.

FIG. 2 shows another lighting apparatus that may be installed with switch device mentioned above.

FIG. 2 has a light cover 2, a lateral wall 4 with some connectors 12, 8, 5. Another ring shape element 6 has a switch 10 that has switch base 11 as mentioned above. There are columns 7 and holes 9 for installing the components.

There is a driver 3 and a main housing 1 in the lighting apparatus.

Figure 3:
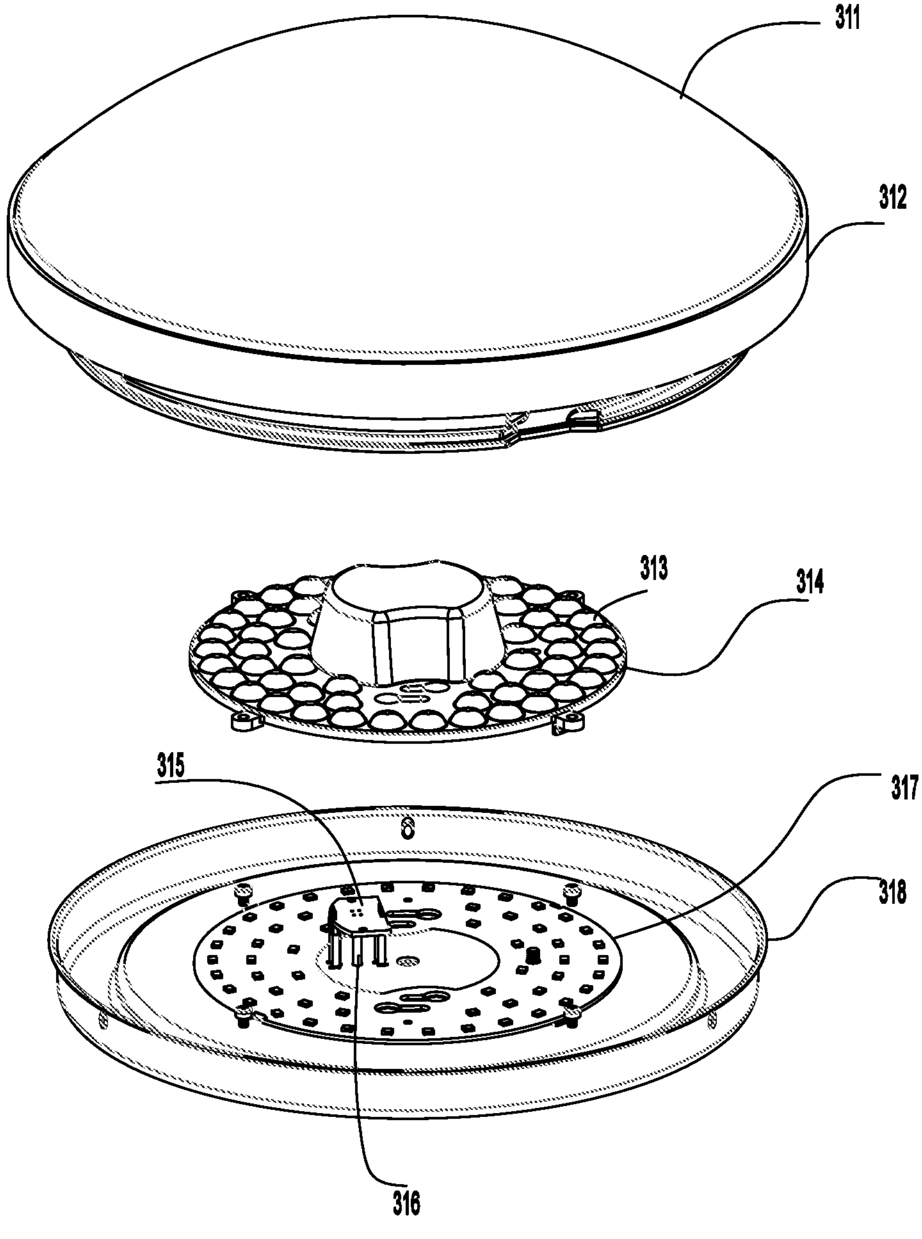
FIG. 3 illustrates another lighting apparatus embodiment.

FIG. 3 shows another lighting apparatus.

In FIG. 3, the lighting apparatus has a light cover 311 that has a lateral wall 312 to be attached to a base housing 318. There is a light source plate 317 mounted with a switch 315 that is coupled to the light source plate 317 with columns 316. There is a lens cover 314 with multiple lenses 313 corresponding to LED modules to be covered.

Figure 4:
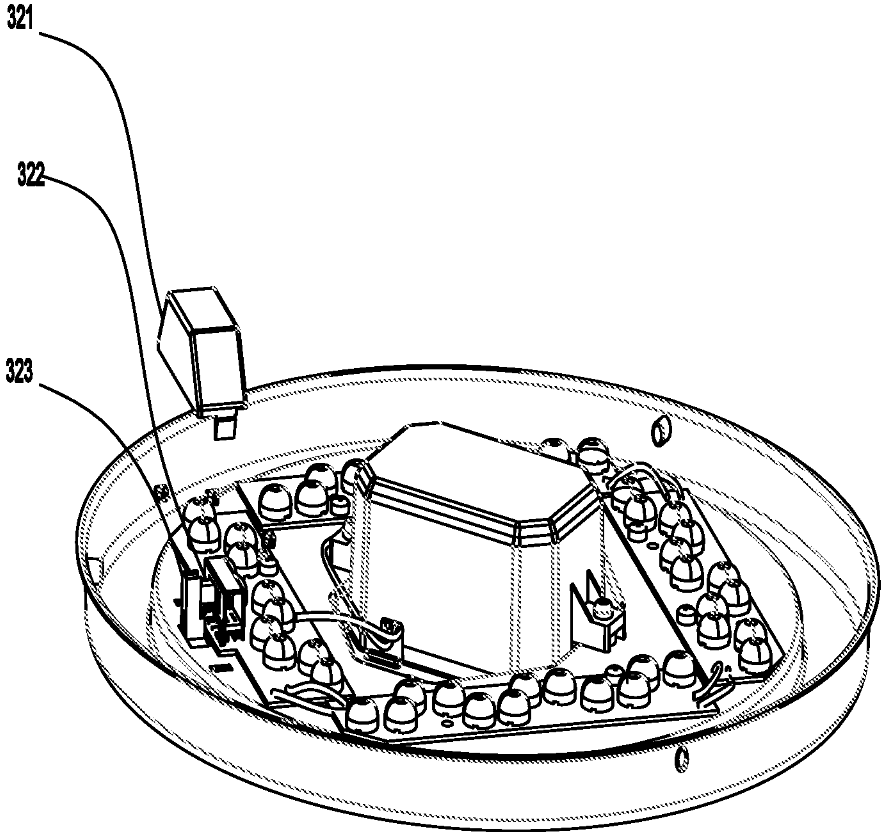
FIG. 4 illustrates another lighting apparatus embodiment.

FIG. 4 shows another example. In FIG. 4, there is a switch cover 321 covering the switch 322 that has a column 323 for holding the switch cover 321.

Figure 5:
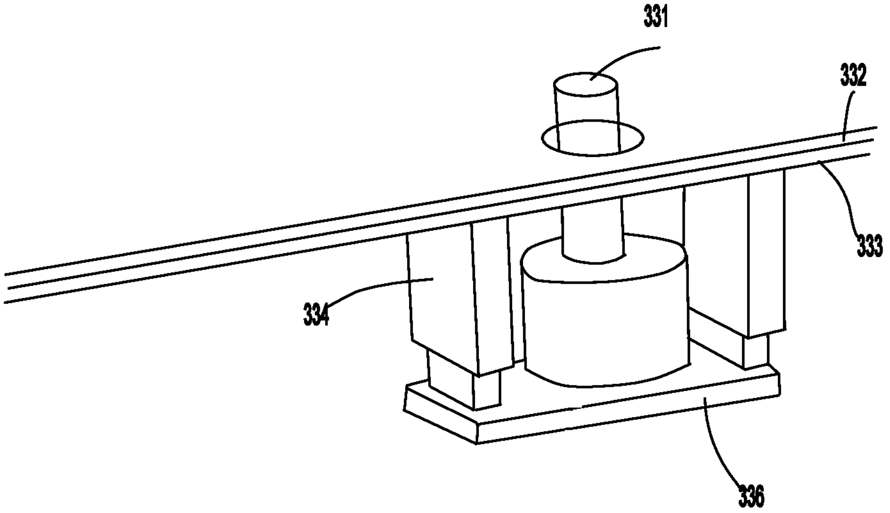
FIG. 5 shows an example of a switch device.

FIG. 5 shows another switch example. In FIG. 5, a switch 331 lever passes through holes of a main housing 332 and a light source plate 333. There is a switch board 336 holding a rotation switch 336. Two columns 334 are used to attach the switch board 336 to the light source plate 333.

FIG. 6 shows a back cover 341 of a main housing has a housing hole 342 for a switch to pass through as mentioned above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus comprising:

a first light source mounted on a first area of a light source plate;

a second light source mounted on a second area of the same light source plate;

a driver circuit mounted on a driver area of the same light source plate, wherein a switch base is mounted on the same light source plate, the switch base is coupled to the driver circuit, wherein the first area, the second area and the driver area are on a front side of the light source plate;

a main housing for enclosing the light source plate, wherein a house opening is disposed on a back side of the main housing, wherein a back side of light source plate faces to the back side of the main housing; and a switch trigger having a first end coupled to the switch base, wherein the switch trigger extends through a plate opening of the light source plate to pass through the house opening to be operated by a user from the back side of the main housing, wherein the switch trigger is operated to change a setting status of the switch base so as to change a light parameter for the driver circuit to control the first light source and the second light source, wherein the main housing has a lateral opening from a lateral wall of the main housing for the switch trigger to pass though to be operated.

2. The lighting apparatus of claim 1, wherein the switch base is a signal converter for converting the setting status as a switch signal provided to the driver circuit to determine how to drive the first light source and the second light source.

3. The lighting apparatus of claim 1, wherein the switch trigger contains a switch board and a trigger lever, wherein the switch board is placed above the front side of the light source plate, wherein the switch board is coupled to the switch base, wherein the trigger lever is extended from the switch board passing through the plate hole toward the back side of the main housing.

4. The lighting apparatus of claim 1, wherein the first light source emits a first light, wherein the second light source emits a second light, wherein the first light and the second light have different color temperatures.

5. The lighting apparatus of claim 4, wherein the first light source and the second light source respectively have multiple LED modules, wherein only a portion of the LED modules of the first light source and the second light source are enabled while other LED modules of the first light source and the second light source are disabled according to the setting status, in which even when the lighting apparatus is turned on, the other LED modules that are disabled do not receive electricity from the driver circuit.

6. The lighting apparatus of claim 5, wherein the switch base enables a physical connection of the portion of the LED modules to the driver circuit while physically disconnecting the other LED modules from the driver circuit according to the setting status of the switch base.

7. The lighting apparatus of claim 6, wherein the driver circuit has a first number of power wires, wherein the LED modules of the first light source and the second light source have a second number of LED modules, wherein each LED module has a connecting wire, wherein the switch base is a routing device for selectively connecting a portion of the connecting wires to the power wires, wherein there are a second number of the connecting wires corresponding to the second number of LED modules, wherein the first number is smaller than the second number, wherein some connecting wires of the LED modules are not physically connected to the power wires when their associated LED modules are disabled.

8. The lighting apparatus of claim 1, wherein the main housing is a downlight housing, wherein the main housing has a surface rim for covering a cavity opening of an installation cavity, wherein a major part of the main housing is inserted into the installation cavity, wherein the lateral wall is hidden by the surface rim in the installation cavity.

9. The lighting apparatus of claim 8, wherein the surface rim has a first side and a second side, wherein the first side of the surface rim faces to the installation cavity, wherein the second side of the surface rim faces to a light exit direction of a light opening defined by the surface rim, wherein a first switch device is placed on the first side to change the setting status of the switch base, wherein the first switch device is concealed by the surface rim.

10. The lighting apparatus of claim 9, wherein a second switch device is disposed on the second side of the surface rim to be operated to change the setting status of the switch base.

11. The lighting apparatus of claim 8, wherein the surface rim is rotatable with respect to a lateral wall of the downlight housing to change the setting status of the switch base.

12. The lighting apparatus of claim 1, wherein an elastic pad is placed to cover the housing opening of the main housing, wherein the elastic pad is configured to be pressed by a user to indirectly engage the switch trigger to change the setting status of the switch base.

13. The lighting apparatus of claim 1, wherein the first light source and the second light source contain multiple LED modules, each module is packaged in a cartridge, wherein the cartridge is detachably inserted to the main housing.

14. The lighting apparatus of claim 1, further comprising a third light source and a separator, wherein the separator separates the first light source and the second light source from the third light source, wherein the third light source emits a third light from a lateral side of the main housing.

15. The lighting apparatus of claim 14, wherein the third light source is placed on a third area of the front side of the light source plate, wherein the third area is in a peripheral area of the light source plate.

16. The lighting apparatus of claim 1, wherein a touch device is placed on an exterior surface of the main housing for receiving a touch operation to change the setting status of the switch base.

17. The lighting apparatus of claim 1, wherein a plug is inserted from the house opening to a different position of the switch base to change the setting status of the switch base.

18. The lighting apparatus of claim 17, wherein the switch plug has two arms, wherein the switch plug has two directions to be inserted into the housing opening to correspond to two different setting statuses of the switch base.

* * * * *